June 23, 1959     A. J. HUCK     2,891,464
TOASTER CONTROL
Filed Oct. 7, 1957     2 Sheets-Sheet 1
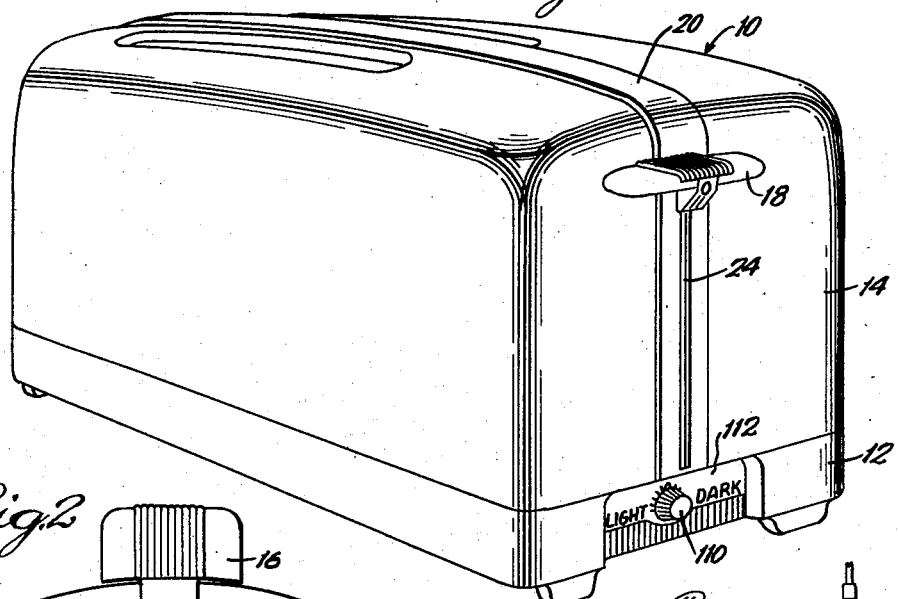
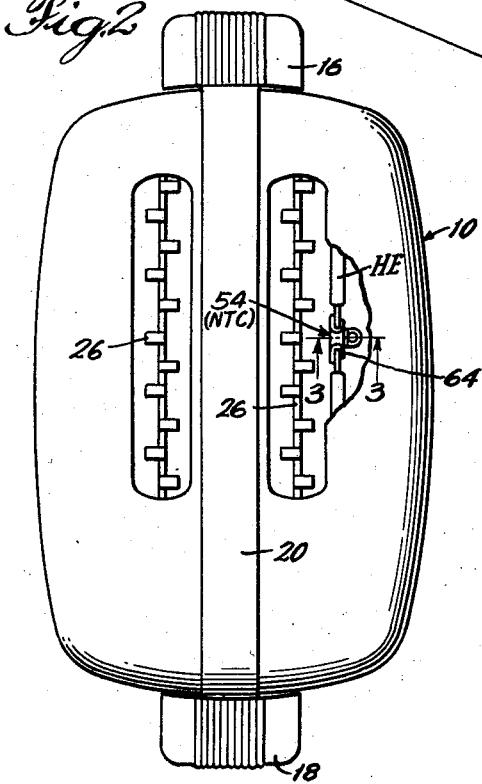
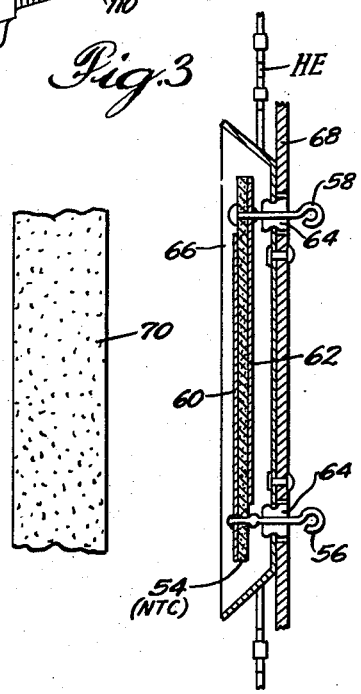
INVENTOR:
Alfred J. Huck,
BY Bair, Freeman & Molinare
ATTORNEYS.

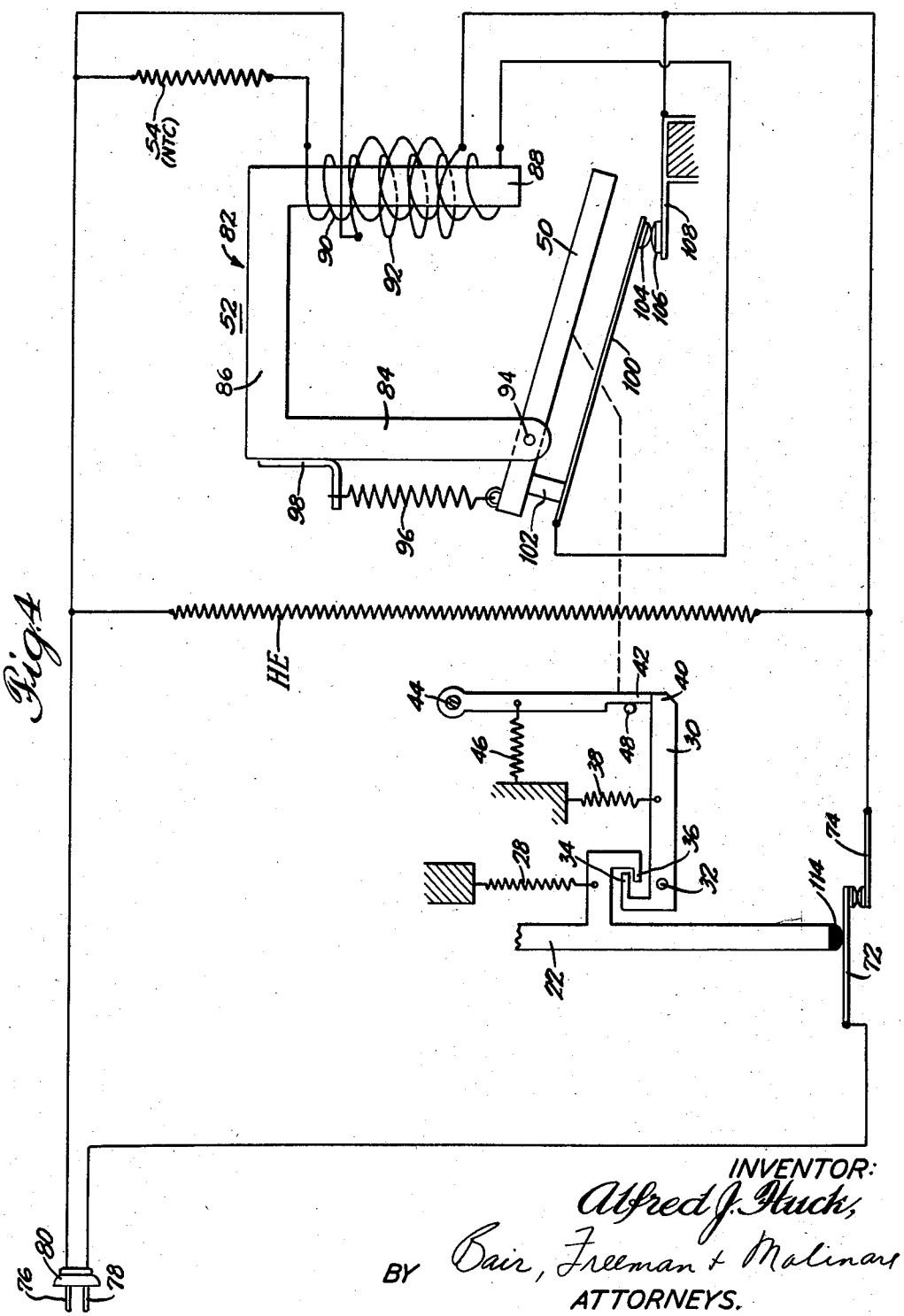

United States Patent Office 2,891,464
Patented June 23, 1959

2,891,464
TOASTER CONTROL
Alfred J. Huck, St. Louis, Mo.
Application October 7, 1957, Serial No. 688,611
6 Claims. (Cl. 99—329)

This invention relates generally to automatic controls for toasters and the like, and more particularly to new and improved control apparatus of increased sensitivity for responding to the surface temperature of the toast and terminating a toasting operation.

This application is a continuation-in-part of my co-pending application, Serial No. 674,910, filed July 29, 1957, which, in turn, is a division of my co-pending application, Serial No. 164,677, filed May 27, 1950 and now issued as United States Patent No. 2,806,421.

It is a general object of this invention to provide a new toaster control which responds to a relatively small stimulus in accordance with the surface temperature of the toast to provide a much greater stimulus for causing the bread carrier to be released and the toasting circuit to be de-energized.

It is another object of this invention to provide a new and highly sensitive toaster control which comprises a differential relay arranged to serve as both a sensitive relay for control purposes and as a power relay for unlatching the bread carrier.

It is still another object of this invention to provide a new and highly sensitive toaster control in which a temperature sensitive element is connected in series with a winding of a differential relay to enable the relay to serve as both a sensitive relay for responding to relatively small current changes resulting from the surface of the toast attaining a desired temperature, and as a power relay for responding to relatively large current changes for actuating a latching mechanism to release the bread carrier.

It is a further object of this invention to provide an automatic control for a toaster, as described above, in which the temperature sensitive element advantageously may take the form of negative temperature coefficient resistance which serves to unbalance the opposing magnetomotive forces in a differential relay when the surface of the toast attains a desired temperature to open circuit to the temperature sensitive element and thereby further unbalance the differential relay.

It is a still further object of this invention to provide an automatic control for a toaster, as described above, wherein the further unbalancing of the differential relay is effected by causing current to flow in only one direction through the coils of the relay, whereby the armature of the relay is actuated with sufficient force to trip the latching mechanism of the bread carrier, thereby releasing the latter and also de-energizing the toasting circuit.

It is a still further object of this invention to provide an improved toast control which is characterized by its efficiency, its reliability, and its high degree of sensitivity.

With these and other objects in view, my invention consists in the construction, arrangement and combination of the various parts of my novel toaster control, whereby the objects contemplated are attained as more fully set forth, pointed out in the claims and illustrated in the accompanying drawing wherein:

Figure 1 is a perspective view of a toaster, which advantageously embodies the automatic toaster control forming the invention;

Figure 2 is a plan view of the toaster shown in Figure 1 with a portion broken away to show the temperature sensitive element;

Figure 3 is an enlarged vertical view taken substantially as shown on line 3—3 of Figure 2; and Figure 4 is a diagrammatic view of the electrical circuit embodying the invention.

Referring now to the drawing, and more particularly to Figures 1 and 2 thereof, there is shown a toaster, indicated generally at 10, which comprises a base 12 preferably formed of an insulating material. A casing 14 of sheet metal is mounted on base 12 for enclosing the toaster mechanism and its control mechanism. Advantageously, the space within the casing 14 may be divided into a toasting compartment and a control compartment by a suitable insulating wall in the manner known in the art.

A pair of handling members 16 and 18 are provided at opposite ends of the toaster casing 14. Advantageously, handling member 16 is fixedly secured to a strip of insulating material 20 extending around the casing 14, and the handling member 18 is secured to a bracket 22 extending through a vertical slot 24 in strip 20.

In any suitable manner known in the art, the bracket 22 is connected to the bread carriers 26 such that the carriers may be lowered into the toasting position by depressing the handling member or knob 18 to the lowermost position of the slot 24. Although the bread carriers 26 may be held in the toasting position during the bread toasting interval by any suitable means, advantageously, the latching mechanism shown in Figure 4 of the drawing may be used for this purpose. As shown therein, the bread carriers 26 normally are maintained in a raised position by means of a spring 28 connected between the bracket 22 and a wall of the toaster. When the bread carrier depressing knob 18 is depressed in the slot 24, the spring 28 will be stretched and when the knob is released, the spring 28 will return the bread carriers 26 to the elevated position except for the action of the latching arrangement provided in the control compartment of the toaster.

Advantageously, the latching arrangement comprises a latch lever 30 pivoted at 32 and having a hook 34 adapted to engage a flange 36 of the bracket 22 when the bracket is depressed. Before the bracket 22 is depressed to place the bread carriers 26 in toasting position, latch lever 30 is pivoted counter-clockwise about pivot 32 by the action of spring 38. Thus, the outer end 40 of lever 30 is held in an elevated position with the side edge of latch 42 held adjacent thereto by the spring 46. When the bracket 22 is depressed, the flange 36 first engages the top of the lever 30 to the right of the pivot 32 to swing the lever in a clockwise direction from the elevated position it normally assumes due to the action of a spring 38, whereupon the hook 34 assumes a position overhanging the flange 36.

During the depressing action of knob 18, the outer end 40 of the lever 30 engages a latch 42 pivoted at 44 and swings it outwardly to permit the end 40 to pass under the latch 42, after which the latch is returned by a spring 46 against a stop 48 for holding the lever 30 in the lowered position and, consequently, for holding the bread carriers 26 in a toasting position.

In accordance with a feature of this invention, the latch 42 is coupled to the armature 50 of a differential relay such that the bracket 22, and therefore the bread carriers 26, may be released at a desired time at the end of the bread toasting interval. The manner in which the armature 50 of the differential relay 52 is actuated at the desired time is explained in greater detail below.

For controlling the action of the differential relay 52 there is provided a temperature sensitive element 54 which advantageously may take the form of a bar of resistance material having a negative temperature coefficient (designated NTC in the drawing). As well understood by those skilled in the art, resistances of this type are characterized by their ability to change radically in resistance in response to temperature changes and in particular, the resistance decreases as the temperature increases. As shown in Figures 2 and 3, the temperature sensitive element 54 advantageously is positioned adjacent the central portion of a slice of toast resting on the bread carriers 26, so as to obtain the maximum response to the average or overall temperature of the surface of the toast.

One preferable mode of mounting the temperature sensitive element 54 is shown in Figure 3, wherein terminal rods or wires 56 and 58 are soldered to the fired silver paint coatings 60 and 62 of the negative temperature coefficient resistor 54. The terminals 56 and 58 extend through insulating bushings 64 supported by a shield 66. The shield 66 in turn is supported by a bar 68 held in vertical position within the toaster casing 14 by suitable support members.

Advantageously, the shield 66 is shaped so that it shields the negative temperature coefficient resistor from direct radiant heat from the heating elements HE to the end that the shield tends to gather and concentrate heat from the surface of a slice of toast indicated at 70 on the resistor 54. Preferably, the negative temperature coefficient resistor 54 is blackened on the bread side for maximum heat absorption from bread surface and bright on the side opposite the bread side for maximum reflection of heat from the heating element 54 back to the toaster casing, so that the response of the resistor 54 to the toast surface temperature is maximal.

In accordance with a feature of this invention, the negative temperature coefficient resistor 54 is connected in a control circuit, shown in Figure 4, which includes the differential relay 52 and the heating elements HE. The heating elements HE are connected in series with the switch blades 72 and 74 to the prongs 76 and 78 of power plug 80 which is adapted to be connected to a suitable power source. The differential relay 52 comprises a U-shaped core 82 formed of three core arms 84, 86 and 88, a pair of oppositely wound coils 90 and 92 wound upon the core arm 88, and an armature 50 advantageously pivoted at the pivot 94 to the core arm 84 and maintained normally spaced from the core arm 88 by means of the spring 96 connected between the bracket 98 and the armature 50. A switch blade 100 is secured to and spaced from the armature 50 by means of the insulated spacer 102, and when the armature 50 is held in normal position by the spring 96, the contact 104 on switch blade 100 is held in engagement with a contact 106 on a switch blade 108.

As shown in Figure 4, the coil 92 on core arm 88 is connected directly in parallel with the heating elements HE while the oppositely wound coil 90 is connected in series with the negative temperature coefficient resistor 54 and the constacts 104 and 106 of switch blades 100 and 108, respectively, across the heating elements HE.

In accordance with the invention, the two coils 90 and 92 on the arm 88 of differential relay 52 are wound in opposite directions and have the same number of ampere-turns. Therefore, each coil normally produces the same magneto motive force, so that under normal operations, each coil cancels out the other so as to neutralize their pulling effect on the armature 50.

As explained above, coil 92 is connected across the main heating elements so that it receives full voltage applied thereto from the power plug 80. The other coil, coil 90, is connected in series with the negative temperature coefficient resistor 54 across the heating elements, and in one particular embodiment of the invention wherein the toaster is connected to a 115 volt source, coil 90 initially has about 55 volts impressed across it, while the negative temperature coefficient resistor 54 has the remaining 60 volts across it. It will be appreciated by those skilled in the art that even though the voltage across the coils 90 and 92 is not the same, the number of ampere-turns of the coils can be made equal to each other by selecting a proper ratio for the number of turns on the coils.

*Practical operation*

The control knob 110 positioned beneath the bread carrier depressing knob 18, at one side of the insulating base 12 of the toaster, as shown in Figure 1, may be set at the position for the color of the toast desired, such as Light or Dark, or positions therebetween as indicated on the dial plate 12 associated with the control knob 110. Those skilled in the art will readily understand that control knob 110 may be connected to the circuit in any suitable manner to control the toasting time period in a selective manner. For example, the control knob 110 may be connected to the armature 50 of differential relay 52 to determine the differential magneto motive force necessary to attract the armature 50 to thereby open the contacts 104 and 106. Other means of controlling the toasting period by means of the control knob 110 will occur to those skilled in the art. Slices of bread are placed on the carriers 26 and the knob 18 is depressed to cause insulating button 114 secured to the bottom of the bracket 22 to engage the switch blade 72 and place its contact in engagement with the contact of the switch blade 74. The flange 36 of the bracket 22 depresses the latch lever 30 to latch it under the latch 42, in the manner explained heretofore.

Closure of the contacts of the switch blades 72 and 74 causes the heating elements HE to be energized and also energizes a first circuit through the coil 92 and a second circuit including the negative temperature coefficient resistor 54 and the coil 90 in series therewith. In accordance with the invention, at the start of the toasting interval, the magneto motive forces produced by the coils 90 and 92 are equal and opposite to each other and consequently, these forces cancel each other out to permit the armature 50 to remain in the position to which it has been pivoted by the spring 96.

As the bread is toasted its surface temperature rises, and this increased temperature is radiated to the negative temperature coefficient resistor 54. As explained heretofore, the shield 66 aids in the collection of the radiant heat rays emitted from the bread and the concentration thereof on the resistor so that the resistor responds primarily to the temperature of the bread and is isolated from the heating effects of the heating elements HE.

As the negative temperature coefficient resistor 54 heats, its resistance drops from its original value so that the current through the resistor 54 and the coil 90 increases. This results in the magneto motive force produced by the coil 90 to increase over the magneto motive force produced by coil 92, since the latter remains constant due to the constant potential applied thereacross.

When the toast is ready, as determined by the color setting of the control knob 110, the current through the negative temperature coefficient resistor 54 and coil 90 has increased sufficiently to overcome the initial balanced condition in the differential relay 52 so that the differential magneto motive force attracts the armature 50 of the relay to slightly open the contacts 104 and 106. As soon as these contacts are slightly opened, the energizing circuit for the negative temperature coefficient resistor 54 and coil 90 is broken, and the current through this circuit drops to zero. At this point, there is no magneto motive force produced by coil 90 to balance out the magneto motive force produced by coil 92, and therefore, the full magneto motive force of the latter is available to pull in armature 50 with a strong, quick pull that is sufficient to trip the latch 42 and release the bread carrier 26 in the manner described above. At this time, due to the rise of the bracket 22, the contacts 72 and 74 are separated to deenergize the entire toasting circuit.

Thus, it will be appreciated that after the toasting interval is initiated, the differential relay 52 serves as a sensitive relay, in that a very small differential in magneto motive force from its opposed coils will attract its armature sufficiently to operate the contacts 104 and 106. Further, upon the opening of contacts 104 and 106, one of the opposing coils in the differential relay is completely de-energized to permit the full magneto motive force of the other coil to "power in" the armature with sufficient force to unlatch the bread carriers and terminate the toasting operation.

It further will be appreciated by those skilled in the art that an additional and considerable advantage achieved from the invention is that the use of the differential relay requires very little current to be used in the negative temperature coefficient resistance since it is energized only during the initial part of the toasting interval and is completely deenergized when the relay is utilized as a power relay. Thus, the negative temperature coefficient resistor does not heat to the point where its internal electrical heating could possibly interfere with the response of the resistor to the surface temperature of the toast, a temperature to which the resistor must be very sensitive to work properly.

It will be understood by those skilled in the art that the negative temperature coefficient resistor disclosed in the drawing and described in the illustrative embodiment set forth above is only one temperature sensitive element which may advantageously be used with the present invention. Thus, other temperature sensitive elements, as for example, a thermostat, could be used in lieu of the negative temperature coefficient resistor, in which case the contacts 104 and 106 could be directly actuated by the thermostat. It further will be understood by those skilled in the art that a separate power relay coil can be energized by the closing of the contacts of the differential relay or, if desired, a thermal motor energized by the closing of the contacts of the differential coil relay could be used in the invention.

Other changes may be made in the construction and arrangement of the parts of the above-described toaster control without departing from the spirit and purpose of the invention and it is intended to cover by the appended claims any modified forms of structure or use of mechanical equivalents which may reasonably be included within their scope.

What is claimed as the invention is:

1. An electric toaster comprising, in combination, electrically energizable heating elements, an energizing circiut for said heating elements, bread slice holding means including latch means for holding a bread slice in toasting position, and toasting interval control means including a differential relay having a pair of oppositely wound coils and an armature actuated in response to an unbalance of the magnetic field produced by said coils, means coupling said armature to said latch means, means connecting one of said coils in parallel with said heating elements, means connecting the other of said coils in series with a temperature sensitive element and with a pair of normally closed contacts controlled by said armature whereby the heating of said temperature sensitive element during the toasting interval varies the current flow in the relay coil connected in series therewith to unbalance the magnetic field produced by said coils, thereby opening said pair of contacts and further unbalancing said magnetic field to pull in said armature and release said bread slice holding means.

2. An electric toaster comprising, in combination, electrically energizable heating elements, an energizing circuit for said heating elements, bread slice holding means including latch means for holding a bread slice in toasting position, and toasting interval control means including a differential relay having a pair of oppositely wound coils and an armature actuated in response to an unbalance of the magnetic field produced by said coils, means coupling said armature to said latch means, means connecting one of said coils in parallel with said heating elements, means connecting the other of said heating coils in series with a temperature sensitive resistance and with a pair of normally closed contacts controlled by said armature whereby the heating of said temperature sensitive resistance during the toasting interval varies the current flow in the relay coil connected in series therewith to unbalance the magnetic field produced by said coils, thereby opening said pair of contacts and further unbalancing said magnetic field to pull in said armature and release said bread slice holding means.

3. An electric toaster comprising, in combination, electrically energizable heating elements, an energizing circuit for said heating elements including a normally open switch, bread slice holding means including latch means for holding a bread slice in toasting position adjacent said heating elements and for closing said normally open switch when said bread slice is in toasting position, and toasting interval control means including a differential relay having a pair of oppositely wound coils and an armature, switch means including a pair of normally closed contacts, means linking one of said contacts to said armature, conductor means connecting one of said coils in parallel with said heating elements, a temperature sensitive element, conductor means connecting said temperature sensitive element, the other differential relay coil, and said pair of contacts in series with each other and across said heating elements, and means coupling said differential relay armature to said latch means whereby the change in current flow through said temperature sensitive element in response to the surface of the toast attaining a desired temperature causes an unbalance in the opposing magnetic forces produced by said coils to actuate the armature of the differential relay and open said pair of contacts to de-energize the temperature sensitive element and the coil connected in series therewith, thereby causing a still greater unbalance in said magnetic forces to actuate said armature further to release said latch means for effecting the opening of the energizing circuit for the heating elements and the release of said bread slice from toasting position.

4. An electric toaster comprising, in combination, electrically energizable heating elements, an energizing circuit for said heating elements including a normally open switch, bread slice holding means including latch means for holding a bread slice in toasting position adjacent said heating elements and for closing said normally open switch when said bread slice is in toasting position, and toasting interval control means including a normally balanced network having a pair of oppositely wound coils and an armature, switch means including a pair of normally closed contacts, means linking one of said contacts to said armature, conductor means connecting one of said coils in parallel with said heating elements, a negative temperature coefficient resistance, conductor means connecting said negative temperature coefficient resistance, the other differential relay coil, and said pair of contacts in a series circuit, and means linking said differential relay armature to said latch means whereby the change in current flow through said negative temperature coefficient resistance in response to the surface of the toast attaining a desired temperature causes an unbalance in said network to actuate the armature of the differential relay and open said pair of contacts to de-energize the temperature sensitive resistance and the coil connected in series therewith, thereby causing a still greater unbalance in said network to actuate said armature further to release said latch means for effecting the opening of the energizing circuit for the heating elements and the release of said bread slice from toasting position.

5. An electric toaster comprising, in combination, electrically energizable heating elements, an energizing circuit for said heating elements, bread slice holding means including latch means for holding a bread slice in toasting position, and toasting interval control means including a differential relay having a pair of oppositely wound coils and an armature actuated in response to an unbalance of the magnetic field produced by said coils, means coupling said armature to said latch means, means connecting one of said coils in parallel with said heating elements, means connecting the other of said heating coils in series with a negative temperature coefficient resistance, and with a pair of normally closed contacts controlled by said armature whereby the heating of said negative temperature coefficient resistance during the toasting interval varies the current flow in the relay coil connected in series therewith to unbalance the magnetic field produced by said coils, thereby opening said pair of contacts and further unbalancing said magnetic field to pull in said armature and release said bread slice holding means.

6. An electric toaster comprising, in combination, electrically energizable heating elements, an energizing circuit for said heating elements, bread slice holding means including latch means for holding a bread slice in toasting position, and toasting interval control means including a normally balanced network including a pair of oppositely wound coils and an armature actuated in response to the unbalance of said coils, means connecting one of said coils in parallel with said heating elements, means connecting the other of said heating coils in series with a temperature sensitive element, and with a pair of normally closed contacts controlled by said armature whereby the heating of said temperature sensitive element causes said coils to become unbalanced, thereby opening said pair of contacts and further unbalancing said coils to pull in said armature and release said bread slice holding means.

References Cited in the file of this patent

UNITED STATES PATENTS 2,541,436    Olving _____ Feb. 13, 1951